US012616228B2

(12) United States Patent
Van Doorn et al.

(10) Patent No.: US 12,616,228 B2
(45) Date of Patent: May 5, 2026

(54) FOOD PROCESS LINE FOR IN-LINE PROCESSING FOOD AND METHOD FOR PROCESSING FOOD

(71) Applicant: MAREL FURTHER PROCESSING B.V., Boxmeer (NL)

(72) Inventors: Hendrikus Cornelis Koos Van Doorn, Boxmeer (NL); Martinus Johannes Willebrordus Van Zoelen, Boxmeer (NL); Johannes Martinus Meulendijks, Boxmeer (NL); Eric Henricus Johannus Carolus Aben, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 703 days.

(21) Appl. No.: 17/774,357

(22) PCT Filed: Nov. 18, 2020

(86) PCT No.: PCT/EP2020/082481
§ 371 (c)(1),
(2) Date: May 4, 2022

(87) PCT Pub. No.: WO2021/099354
PCT Pub. Date: May 27, 2021

(65) Prior Publication Data
US 2022/0400713 A1 Dec. 22, 2022

(30) Foreign Application Priority Data
Nov. 18, 2019 (NL) ...................................... 2024251

(51) Int. Cl.
A23L 5/10 (2016.01)
A23L 13/00 (2016.01)
(Continued)

(52) U.S. Cl.
CPC ................. *A23L 5/11* (2016.08); *A23L 13/03* (2016.08); *A23P 20/12* (2016.08); *A23P 20/15* (2016.08); *A23P 30/10* (2016.08)

(58) Field of Classification Search
CPC ... A23L 5/11; A23L 13/03; A23L 5/15; A23L 13/52; A23L 13/57; A23L 13/67;
(Continued)

(56) References Cited

U.S. PATENT DOCUMENTS

| | | | | |
|---|---|---|---|---|
| 3,656,766 A | * | 4/1972 | Geffroy | F16J 9/00 277/468 |
| 4,309,450 A | * | 1/1982 | Seibert | A23P 20/12 426/302 |

(Continued)

FOREIGN PATENT DOCUMENTS

| | | |
|---|---|---|
| CA | 2495948 A1 | 8/2006 |
| CN | 107668107 A | 2/2018 |

(Continued)

OTHER PUBLICATIONS

Chinese Office Action from Corresponding Chinese Patent Application No. CN202080078242.6, Nov. 20, 2023.
(Continued)

*Primary Examiner* — Drew E Becker
(74) *Attorney, Agent, or Firm* — Workman Nydegger

(57) ABSTRACT

A food process line and method are provided for processing food in a food process line. The food process line includes at least two of the following process line stations: a food preparation station, cold store, pump station or forming station for a pumpable food mass, or a dry coater, wet coating device, fryer, heater or freezer for the discrete food products. In each process line station at least one process step is carried out, the process line station having one or more actuators and/or one or more sensors. The food process (Continued)

line comprises an interstation control system configured to control an actuator of a first process line station on the basis of data from a sensor of a second process line station.

5 Claims, 7 Drawing Sheets

(51) Int. Cl.
  *A23P 20/12*         (2016.01)
  *A23P 20/15*         (2016.01)
  *A23P 30/10*         (2016.01)
(58) Field of Classification Search
  CPC .......... A23B 2/803; A23P 20/12; A23P 20/15;
    A23P 30/10; A23P 20/10; A22C 7/00;
    A22C 18/00; H10D 30/0612; A47J
    37/12–1295
  See application file for complete search history.

(56) References Cited

U.S. PATENT DOCUMENTS

| | | | | |
|---|---|---|---|---|
| 4,933,199 | A * | 6/1990 | Neel ....................... | A23L 19/18 |
| | | | | 426/455 |
| 6,117,463 | A * | 9/2000 | Alexander .............. | A23L 13/03 |
| | | | | 426/291 |
| 6,764,701 | B1 | 7/2004 | Mochizuki et al. | |
| 6,863,913 | B1 | 3/2005 | Navin et al. | |
| 6,866,417 | B2 | 3/2005 | Gunawardena et al. | |
| 7,008,657 | B2 | 3/2006 | Falk et al. | |
| 7,068,817 | B2 | 6/2006 | Bourg, Jr. et al. | |
| 9,014,434 | B2 | 4/2015 | Bajema et al. | |
| 9,016,456 | B1 | 4/2015 | Neiser et al. | |
| 9,182,126 | B2 | 11/2015 | Cartwright et al. | |
| 9,366,579 | B2 | 6/2016 | Hocker et al. | |
| 9,366,580 | B2 * | 6/2016 | Hocker .................. | B65G 47/53 |
| 9,538,880 | B2 | 1/2017 | Riefenstein | |
| 9,957,074 | B2 | 5/2018 | Petri et al. | |
| 9,983,572 | B2 | 5/2018 | Pfarr et al. | |
| 10,028,513 | B2 | 7/2018 | Bartlett | |
| 10,070,661 | B2 | 9/2018 | Bai et al. | |
| 10,223,933 | B1 | 3/2019 | Cheng et al. | |
| 10,292,409 | B2 | 5/2019 | Auernheimer et al. | |
| 10,485,380 | B2 | 11/2019 | Fagan | |
| 10,743,710 | B2 | 8/2020 | Frehn et al. | |
| 2002/0022072 | A1 * | 2/2002 | Burke ..................... | A23P 20/15 |
| | | | | 118/19 |
| 2005/0092312 | A1 | 5/2005 | Gunawardena et al. | |
| 2006/0207436 | A1 * | 9/2006 | Nothum .............. | A47J 37/1214 |
| | | | | 99/352 |
| 2008/0274240 | A1 | 11/2008 | Germouni et al. | |
| 2009/0252832 | A1 * | 10/2009 | Falk ......................... | A22C 9/00 |
| | | | | 426/59 |
| 2010/0040750 | A1 * | 2/2010 | Assaad ..................... | A23L 5/11 |
| | | | | 426/438 |
| 2013/0243915 | A1 * | 9/2013 | Obert ..................... | A23P 30/00 |
| | | | | 426/442 |
| 2014/0106049 | A1 * | 4/2014 | Fillmore ................... | A23L 7/13 |
| | | | | 426/550 |
| 2014/0220197 | A1 * | 8/2014 | Hocker .................. | G01K 1/146 |
| | | | | 426/233 |
| 2014/0364971 | A1 * | 12/2014 | Minvielle ............ | G05B 13/021 |
| | | | | 700/90 |
| 2015/0010679 | A1 | 1/2015 | Strong et al. | |
| 2015/0044335 | A1 * | 2/2015 | Meulendijks ........ | A22C 7/0069 |
| | | | | 426/512 |
| 2016/0165906 | A1 | 6/2016 | Lasslop | |
| 2016/0331176 | A1 | 11/2016 | Frehn et al. | |
| 2017/0086479 | A1 * | 3/2017 | Bai ...................... | G01N 29/041 |
| 2017/0089869 | A1 * | 3/2017 | Bai ........................ | G01N 33/10 |
| 2017/0095112 | A1 | 4/2017 | Baker et al. | |
| 2017/0172160 | A1 * | 6/2017 | Magana ................... | A21D 8/02 |
| 2017/0251679 | A1 * | 9/2017 | Bartlett .................... | A21C 3/02 |
| 2017/0290345 | A1 * | 10/2017 | Garden ................... | A21C 9/08 |
| 2018/0110368 | A1 * | 4/2018 | Fagan ................. | A47J 37/1276 |
| 2018/0282068 | A1 * | 10/2018 | Nothum, Jr. ......... | B65G 41/005 |
| 2019/0128750 | A1 | 5/2019 | Cairns et al. | |
| 2019/0174769 | A1 | 6/2019 | Dingman et al. | |
| 2022/0266307 | A1 * | 8/2022 | Benedetti ................ | B07C 5/342 |
| 2024/0122216 | A1 * | 4/2024 | Van Doorn ............. | A23L 13/57 |

FOREIGN PATENT DOCUMENTS

| | | |
|---|---|---|
| CN | 107920689 A | 4/2018 |
| CN | 110049680 A | 7/2019 |
| EP | 2481295 A1 | 8/2012 |
| EP | 3422872 A1 | 1/2019 |
| GB | 2289963 B | 5/1999 |
| JP | S6222573 A | 1/1987 |
| JP | H07250764 A | 10/1995 |
| JP | 2003325138 A | 11/2003 |
| JP | 4603932 B2 | 12/2010 |
| JP | 5237646 B2 | 7/2013 |
| WO | 0030458 A1 | 6/2000 |
| WO | 0069288 A1 | 11/2000 |
| WO | 2004002229 A2 | 1/2004 |
| WO | 2005107481 A2 | 11/2005 |
| WO | 2006108690 A2 | 10/2006 |
| WO | 2010110655 A8 | 8/2010 |
| WO | 2014017916 A2 | 1/2014 |

OTHER PUBLICATIONS

Netherlands Search Report from NL Application No. 2024251, Jul. 10, 2020.
International Search Report from PCT Application No. PCT/EP2020/082481, Feb. 23, 2021.
Japanese Office Action from Corresponding Japanese Patent Application No. JP2022-521435, Jun. 25, 2024.
Talburt, William et al., "Potato Production and Food Processing", Shanghai Science and Technology Press, Jan. 31, 2017, p. 306.
Chinese Office Action from Corresponding Chinese Patent Application No. CN202080078242.6, Sep. 29, 2024.

* cited by examiner

FOOD PROCESS LINE FOR IN-LINE PROCESSING FOOD AND METHOD FOR PROCESSING FOOD

BACKGROUND

The present invention relates to a food process line for in-line processing food, and a method for processing food in such a food process line.

A food process line comprises for example the following process line stations:

A. food preparation station for preparing a pumpable food mass;

B. cold store for cold storing a pumpable food mass;

C. pump station for pumping a pumpable food mass;

D. forming station for forming discrete food products from a pumpable food mass;

E. dry coater for coating discrete food products with a dry coating;

F. wet coating device for coating discrete food products with a wet coating, optionally comprising a batter mixer;

G. fryer for frying discrete food products;

H. heater for subjecting discrete food products to a heat treatment;

I. freezer for freezing discrete food products;

Exemplary discrete food products processed in a food process line according to the invention are burgers such as hamburgers, burgers, balls, nuggets, schnitzels, sausages, etc. etc.

In a process line station of the food process line at least one process step on the food product is carried out. According to the invention a process step is carrying out an operation in relation to the food by one or more actuators, and/or acquiring data by one or more sensors.

Hence, it is conceivable that a process line station is formed by a transport unit equipped with a sensor. A process line station can also be formed by multiple actuators for carrying out an operation in relation to the food, and one or more sensors acquiring data relating to the food and/or to the process line station. It is known in the art to provide a station controller communicatively connected to an actuator and a sensor of the same process line station, configured to control the actuator of the same process line station on the basis of data from the sensor of the same process line station. For example, the process line station is formed by a mixer, a viscosity sensor in the mixer and a mixer control system, wherein the mixing speed is controlled on the basis of data from the viscosity sensor. In another example, the process line station is formed by a heater, a product temperature sensor provided when the products exit the heater and a heater control system, wherein the temperature in the heater is controlled on the basis of data from the product temperature sensor.

The actuators are provided to carry out an operation in relation to the food. Such an operation may involve contact with the food, e.g. mixing or forming, but operations without contact are also conceivable, such as controlling the climate of the process line station.

Exemplary actuators associated with a process line station are thermal actuators to set the temperature in the process line station, moist systems to set the humidity in a process line station, and transport speed actuators, e.g. controlling belt speed or robot speed for controlling the residence time, also referred to as dwell time, of food or a discrete food product in the process line station.

One or more sensors of the process line station are provided for acquiring data relating to the food and/or to the process line station. In a process line station wherein an operation in relation to the food is carried out, the one or more sensors may acquire data prior to and/or during and/or after carrying out the operation, e.g. upon entry or prior to leaving the process line station.

An exemplary and frequently applied sensor associated with a process line station is a temperature sensor, e.g. using a thermocouple or a thermal radiation thermometer such as an infrared thermometer. Contact temperature sensor types are conceivable, but also non-contact sensor types. Other commonly applied sensors involve an optical system such as a camera, e.g. detecting volume, colour and one or more dimensions such as shape, width, length and/or height. Weight sensors such as scales are also common.

SUMMARY

The aim of the invention is to provide a food process line and method for processing food with improved control of processing food.

According to a first aspect of the invention, the food process line comprises at least three of the following process line stations:

A. food preparation station for preparing a pumpable food mass;

B. cold store for cold storing a pumpable food mass;

C. pump station for pumping a pumpable food mass;

D. forming station for forming discrete food products from a pumpable food mass;

E. dry coater for coating discrete food products with a dry coating, e.g. comprising an air knife for blowing off excess dry coating;

F. wet coating device for coating discrete food products with a wet coating, optionally comprising a batter mixer;

G. fryer for frying discrete food products;

H. heater for subjecting discrete food products to a heat treatment;

I. freezer for freezing discrete food products;

wherein the food process line comprises:

a first process line station of said three process line stations, which is equipped with an actuator for carrying out an operation in relation to the food; and a second process line station of said three process line stations, which is equipped with a sensor acquiring data relating to the food and/or to the process line station;

a third process line station of said three process line stations, which is provided in the food process line between the first process line station and the second process line station;

an interstation control system communicatively connected to the actuator of the first process line station and the sensor of the second process line station, which interstation control system is configured to control the actuator of the first process line station on the basis of data from the sensor of the second process line station.

Such an interstation control system manages, commands, directs, or regulates the behaviour of process line stations using control loops. The control action from the interstation control system is dependent on an actual process variable as acquired from the sensor. Possibly the control action is also dependent on a desired process variable, allowing a feedback loop which ensures the interstation control system exerts a control action in the process line station at the same value as the desired process variable.

This configuration provides improved control of the process as will be elucidated in relation to the examples below. The invention e.g. enables intelligent feedback routines and intelligent anticipations of settings.

In embodiments, the food process line of the invention comprises more than two process line stations, including process line stations not listed above. It is conceivable that the interstation control system connects two process line stations of the limitative list above, or that the interstation control system is configured to connect to one or more process line stations not listed above.

In embodiments, the first process line station of which the actuator is controlled is provided upstream of the second process line station with which the sensor is associated.

In embodiments, the first process line station of which the actuator is controlled is provided downstream of the second process line station with which the sensor is associated.

In each process line station at least one process step is carried out, each process line station comprises:

one or more actuators for carrying out an operation in relation to the food; and/or one or more sensors acquiring data relating to the food and/or to the process line station; and possibly a station controller communicatively connected to an actuator and a sensor of the same process line station, configured to control the actuator of the same process line station on the basis of data from the sensor of the same process line station.

Such a station controller e.g. increases the temperature or the dwell time if a sensor measures that the temperature of the food product is too low.

In embodiments, the interstation control system is also communicatively connected to at least two station controllers of distinct process line stations, thereby forming a main control system.

In embodiments, the interstation control system is communicatively connected to an actuator and/or sensor of a process line station via the controller of that same process line station.

In embodiments, the interstation control system is configured to control the actuator of the first process line station and to control an actuator of a further process line station on the basis of data from the sensor of the second process line station. Hence, on the basis of data from one sensor, actuators of multiple processing line stations are controlled. E.g., given a certain viscosity of the mass in a food preparation station, the temperature of the fryer and the heater is controlled.

In embodiments, the interstation control system is configured to control the actuator of the first process line station on the basis of data from the sensor of the second process line station and on the basis of data from a sensor of a further process line station. Hence, on the basis of data of sensors of multiple process line stations, the actuator of another process line station is controlled. E.g., on the basis of weight data of the products, from sensors at the dry coater and wet coater device, the dwell time in the fryer is adjusted. Advantageously, the more coating, the more weight the products have, the longer the dwell time.

In embodiments, the interstation control system is configured to acquire and store a collection of data from a sensor in a memory, and wherein the actuator of the first process line station is controlled on the basis of an analysis of this collection of data. Hence, the actuator is not controlled on the basis of a single result of a sensor. Thus only when the analyses of the collection of data reveals a trend, the actuator is controlled. This prevents 'overactivity' of the actuator, as a fluctuation in the acquired data is common.

In embodiments a computing system is provided comprising one or more processors and a memory coupled to the one or more processors and storing program instructions, in particular a computer readable program code, that when executed by the one or more processors cause the one or more processors to at least determine data from the second process line station, and on the basis thereof instruct the actuators of the first process line station.

In embodiments a computing system is provided comprising one or more processors and a memory coupled to the one or more processors and storing program instructions, in particular a computer readable program code, that when executed by the one or more processors cause the one or more processors to at least operate the sensor of the second process line station to obtain data; communicate the data from the sensor to the interstation control system; and control the actuator of the first process line station on the basis of data from the sensor of the second process line station.

The present invention also relates to a method for processing food in a food process line, preferably a food process line as described above, comprising the steps of:

operating the sensor of the second process line station to obtain data;

communicating the data from the sensor to the interstation control system;

controlling the actuator of the first process line station on the basis of data from the sensor of the second process line station.

The invention further relates to a computer-implemented method for processing food in a food process line as described above, further comprising a computing system comprising one or more processors, preferably microprocessors, wherein the method involves the processors executing computer readable program code for:

operating the sensor of the second process line station to obtain data;

communicating the data from the sensor to the interstation control system;

controlling the actuator of the first process line station on the basis of data from the sensor of the second process line station.

The invention further relates to a computer-implemented method for processing food in a food process line as described above, further comprising a computing system comprising one or more processors, preferably microprocessors, wherein the method involves the processors executing computer readable program code for determining data from the second process line station, and on the basis thereof instruct the actuators of the first process line station.

The invention further relates to a computer program or suite of computer programs comprising at least one computer readable code portion or a computer program product storing at least one computer readable code portion, the computer readable code portion, when run on a computer system, being configured for executing the method as described above.

Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized.

A computer readable signal medium may include a propagated data signal with computer readable program code embodied therein, for example, in baseband or as (part of) a carrier wave. Such a propagated signal may take any of a variety of forms such as electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, such as wireless, wireline, optical fiber, cable, RF, etc., or any suitable combination of the foregoing. Computer program code for carrying out operations for aspects of the present invention can be written in one or more programming languages or combinations thereof, including object oriented programming language such as Java™, Smalltalk, C++ or the like and conventional procedural programming languages, such as the "C" programming language or similar programming languages. In embodiments, the program code executes on the user's computer, or alternatively partly on the user's computer, as a stand-alone software package, or alternatively partly on the user's computer and partly on a remote computer, or entirely on the remote computer or server. The remote computer may be connected to the user's computer through any type of network, including a local area network (LAN) or a wide area network (WAN), or the connection may be made to an external computer.

Below exemplary embodiments of such process line stations are elucidated, with optional actuators and/or sensors.

A. Food Preparation Station

A food preparation station for preparing a pumpable food mass e.g. comprises a tumbler, a cutter and/or a grinder. Possibly an additive addition device is provided for adding marinade and/or seasoning. Possibly a $CO_2$ addition device is provided.

Exemplary actuators associated with such a food preparation station are speed actuators setting the speed of operation, e.g. of the tumbler, cutter, grinder. Another possible actuator is the additive (marinade, seasoning, $CO_2$) addition rate. Preferably actuators are provided setting the ingredients of additive, e.g. marinade, in particular salt and glucose.

An exemplary sensor in a food preparation station measures the glucose content of food mass, and/or the density of the mass, and/or the viscosity.

In embodiments, a food preparation station controller is provided, which is communicatively connected to an actuator and a sensor of the food preparation station, for controlling the actuator on the basis of data from the sensor. For example:
    the marinade addition rate and/or the marinade ingredients in the food preparation station are controlled on the basis of a colour scan of the food mass upon leaving the food preparation device,
    the $CO_2$-addition in the food preparation station is controlled on the basis of the food temperature during and/or after food preparation,
    the temperature in the food preparation station is controlled on the basis of the food temperature prior to and/or during and/or after food preparation.

B. Cold Store for Pumpable Food Mass

In a cold store a food mass is allowed to reside, e.g. as a buffer or to actively bring the food mass to a desired temperature. In embodiments, liquid nitrogen cooling is performed.

In embodiments, a cold store control system is provided, which is communicatively connected to an actuator and a sensor of the cold store, for controlling the actuator on the basis of data from the sensor. For example:
    the temperature in the cold store is controlled on the basis of the food temperature prior to and/or during and/or after the cold store, e.g. liquid nitrogen cooling is controlled.

C. Pump Station for a Pumpable Food Mass

A pump station generally comprises a hopper and a pump. The pump may operate continuously such as a screw pump, or batch-wise such as a plunger pump. An exemplary actuator associated with such a pump station is a speed actuator setting the speed of operation of the pump. Also common is a thermal actuator to set the temperature in the pump. Such a pump station may comprise a viscosity sensor for the food mass.

In embodiments, a pump station controller is provided, which is communicatively connected to an actuator and a sensor of the pump station, for controlling the actuator on the basis of data from the sensor. For example:
    the temperature in the pump is controlled on the basis of the food temperature in the hopper;
    the pump speed is controlled on the basis of the viscosity of the food mass.

D. Forming Station for Forming Discrete Food Products

In a forming station discrete food products are formed from a pumpable food mass. Such a station generally comprises a hopper for the food mass, a forming device and conveying means for the formed, discrete food products, such as a belt conveyor. The forming device e.g. comprises a moulding device or a sausage machine.

It is possible that the pump station and the forming station are separate stations, e.g. produced by different machine factories. However, in embodiments, the forming station is provided with an associated pump, and possibly also a hopper. This ensemble of pump and forming station can be produced as a single unit by the same machine factory.

Such a moulding device is commercially available from the same applicant. It is described e.g. in multiple applications of the same applicant, e.g. WO0030458, WO2004002229, WO2005107481, WO2010110655, WO2014017916 etc. etc. Exemplary actuators of such a moulding device include actuators setting the fill pressure, fill plate pressure settings, thermal actuators for heating of the hopper and/or the piping between hopper and moulding device, pump speed, etc.

Sausage machines are also commercially available from the same applicant. Exemplary actuators of such a sausage machine include thermal actuators for heating of the hopper and/or the piping between hopper and sausage machine, pump speed, etc.

Commonly temperature sensors are applied to measure the temperature of the food in the hopper and in the forming device, and scales to measure the weight.

In embodiments, a forming station controller is provided, which is communicatively connected to an actuator and a sensor of the forming station, for controlling the actuator on the basis of data from the sensor. For example:
    the fill pressure and/or the fill plate pressure settings of the moulding device are controlled on the basis of the food temperature in the hopper;

the fill pressure and/or the fill plate pressure settings are controlled on the basis of the food product weight and/or the food product dimensions upon leaving the forming station;

the temperature of the piping between hopper and moulding device/sausage machine is controlled on the basis of the food temperature in the hopper the operation of the forming device is stopped when the dimension of formed food products is out of range, and/or when foreign bodies are detected.

E. Dry Coater for Discrete Food Products

In a dry coater discrete food products are coated with a dry coating. Such a station generally comprises a hopper for the dry coating, coating distribution means and possibly an air knife for blowing off excess dry coating.

An exemplary actuator of a dry coater is a distribution speed actuator for the dry coating, setting the coating rate. Other possible actuators are capable of setting a blow-off speed, a blow-off air temperature, and/or a food product transport rate.

Exemplary sensors of a dry coater monitor the dry coating consumption, and/or the stickiness of the food product prior to coating.

In embodiments, a dry coater control system is provided, which is communicatively connected to an actuator and a sensor of the dry coater station, for controlling the actuator on the basis of data from the sensor. For example:

the blow-off air temperature and/or blow-off speed of the dry coater is/are controlled on the basis of food product weight after coating;

the blow-off air temperature and/or blow-off speed of the dry coater is/are controlled on the basis of coating coverage after coating;

the coating rate is controlled on the basis of the stickiness of the food product prior to coating.

F. Wet Coating Device for Discrete Food Products

In a wet coating device discrete food products are coated with a wet coating. Such a station optionally comprises a batter mixer to create the wet coating, a liquid vessel for the wet coating and distribution means.

Exemplary actuators of a wet coating device include actuators setting a blow-off speed, batter temperature, batter mixing speed, batter mixture, food product transport rate, dosing rate, etc.

Exemplary sensors provided in a wet coating device acquire data relating to the batter viscosity, batter temperature in batter mixer, batter temperature upon entry of coating device, wet coating consumption, etc.

In embodiments, a wet coater control system is provided, which is communicatively connected to an actuator and a sensor of the wet coater station, for controlling the actuator on the basis of data from the sensor. For example:

the blow-off air temperature and/or blow-off speed of the wet coating device is/are controlled on the basis of the batter mixture;

the blow-off air temperature and/or blow-off speed of the wet coating device is/are controlled on the basis of food product weight after coating.

G. Fryer for Discrete Food Products

In a fryer discrete food products are fried. Commonly a deep fryer is applied in which the food products are submerged in hot fat, commonly oil. Other industrially applied frying techniques include a pressure fryer or vacuum fryer. In such a fryer station, optionally provisions are available to for separating surplus frying fat, e.g. excess oil, from the fried discrete food products, e.g. by absorption or allowing the food products to drain out.

Exemplary actuators of a fryer include actuators setting the oil circulation, the oil composition, in particular the oil mixture old/new, etc. The dwell time in a fryer can e.g. be controlled by controlling a belt velocity on which food products are transported through the fryer.

Exemplary sensors provided in a fryer acquire data relating to oil quality, e.g. colour, oil filter information, oil consumption (per product), coating quality on food product upon leaving the fryer. Possibly a camera is provided to detect agglomerated products upon leaving the fryer. Also the temperature of the products are commonly measured, e.g. prior to and after the frying process. Such a sensor advantageously measures the core temperature of the products.

In embodiments, a fryer control system is provided, which is communicatively connected to an actuator and a sensor of the fryer, for controlling the actuator on the basis of data from the sensor. For example:

the dwell time in the fryer is controlled on the basis of the food product temperature prior to entering the frying;

the dwell time in the fryer is controlled on the basis of the food product colour after frying;

the dwell time and oil temperature in the fryer are controlled on the basis of the oil consumption per product and/or food product colour after frying and/or coating quality on food product after frying.

H. Heater for Discrete Food Products

In a heater the food products are subjected to a heat treatment, e.g. cooking the products. The heater optionally comprises a conveyor belt on which discrete food products are transported. In embodiments, a convection heater is provided, e.g. with two climate chambers, which can be controlled individually.

Exemplary actuators of a heater include actuators setting the air circulation speed and/or a dew point.

Exemplary sensors of a heater are a dew point sensor and a camera detecting fatty (lecithin) imprints of the food products on the conveyor belt leaving the heater. Also the temperature of the products are commonly measured, e.g. prior to and after the heating process. Such a sensor advantageously measures the core temperature of the products.

In embodiments, a heater control system is provided, which is communicatively connected to an actuator and a sensor of the heater, for controlling the actuator on the basis of data from the sensor. For example:

the dwell time and/or air circulation speed in the heater are controlled on the basis of food product colour after the heat treatment, and/or fatty (lecithin) imprints of the food products on the conveyor belt after the heat treatment;

the air temperature and/or air circulation speed and/or dwell time and/or dew point in the heater is/are controlled on the basis of the food product weight and/or volume prior to the heat treatment in comparison with the food product weight and/or volume after the heat treatment.

I. Freezer for Discrete Food Products

In a freezer discrete food products are frozen. Such a freezer commonly comprises a conveyor belt for transporting the food products, preferably creating Individual Quality Frozen (IQF) food products.

In embodiments, a freezer control system is provided, which is communicatively connected to an actuator and a sensor of the freezer, for controlling the actuator on the basis of data from the sensor. For example:

the temperature in the freezer is controlled on the basis of the food temperature prior to and/or during and/or after the freezer. Such a sensor advantageously measures the core temperature of the products.

EXAMPLES

A first embodiment of an inventive food process line for in-line processing food comprises five process line stations. In succession:

a forming station, such as a moulding device for moulding three-dimensional discrete food products from a mass. In particular, the moulding device is designed to produce discrete food products from a mass of pounded meat, for example hamburgers or nuggets;

a wet coating device, such as a device designed to coat the outside of discrete food products with a layer of a liquid material, e.g. batter;

a dry coater, such as a crumbing device which can be used to apply a layer of coating material in crumb form to the outside of discrete food products;

a fryer, e.g. provided with a deep-frying bath;

and a freezer for freezing discrete food products.

The forming station e.g. comprises a hopper, a pump and a mould drum. The pump preferably comprises a sensor acquiring data relating to the food mass, such as temperature and viscosity. The fryer e.g. comprises a conveyor, e.g. a belt conveyor, transporting the food products through the fryer. Advantageously, the velocity of the conveyor can be controlled, to adjust the dwell time of the food products in the fryer.

According to a first aspect of the invention, an interstation control system is provided, which is communicatively connected to the actuator of the conveyor and the sensor of the pump. The interstation control system is configured to control the actuator of the conveyor, and hence the dwell time in the freezer, on the basis of data such as temperature and viscosity from the sensor in the pump of the forming station. Hence, here two processing stations, the wet coating device and dry coater, are provided between the station with the actuator and the station with the sensor. An advantage of this inventive interstation control system is that based on the viscosity, the settings of the fryer can be adjusted, prior to the arrival of the first products.

A second exemplary embodiment of an inventive food process line comprises three process line stations. In succession:

a forming station, such as here a moulding device for moulding three-dimensional discrete food products from a mass. In particular, the moulding device is designed to produce discrete food products from a mass of pounded meat, for example hamburgers or nuggets. Preferably, a camera is provided downstream of the moulding device, detecting the food product dimensions upon leaving the forming station;

a wet coating device, here a device designed to coat the outside of discrete food products with a layer of a liquid material, e.g. batter;

a heater, here an oven for heating discrete food products. Preferably, the heater comprises actuators for controlling the air temperature and/or air circulation speed and/or dwell time in the convection heater.

According to the invention, an interstation control system is provided, which is e.g. communicatively connected to the camera of the forming station and the actuators of the heater. Advantageously, the interstation control system is configured to control the heater actuators on the basis of the food product dimensions upon leaving the forming station. Hence, here the wet coating device is provided between the station with the sensor and the station with the heater actuators. An advantage is that the oven temperature settings can be set, based on the dimensions of the food products, prior to the arrival of the food products.

Further examples of the invention will be presented in relation to the drawings.

The present invention also relates to one or more of the following clauses:

1. Food process line for in-line processing food, wherein the food process line comprises at least two of the following process line stations:

A. food preparation station for preparing a pumpable food mass;

B. cold store for cold storing a pumpable food mass;

CD. pump and forming station for forming discrete food products from a pumpable food mass;

E. dry coater for coating discrete food products with a dry coating, e.g. comprising an air knife for blowing off excess dry coating;

F. wet coating device for coating discrete food products with a wet coating, optionally comprising a batter mixer;

G. fryer for frying discrete food products;

H. heater for subjecting discrete food products to a heat treatment;

I. freezer for freezing discrete food products;

wherein the food process line comprises:

a first process line station of said two process line stations, which is equipped with an actuator for carrying out an operation in relation to the food; and a second process line station of said two process line stations, which is equipped with a sensor acquiring data relating to the food and/or to the process line station;

an interstation control system communicatively connected to the actuator of the first process line station and the sensor of the second process line station, wherein the interstation control system is configured to control the actuator of the first process line station on the basis of data from the sensor of the second process line station.

2. Food process line according to clause 1, wherein at least a third process line station of said list of process line stations is provided between the first process line station of which the actuator is controlled and the second process line station with which the sensor is associated.

3. Food process line according to clause 1 or 2, wherein the first process line station of which the actuator is controlled is provided upstream of the second process line station with which the sensor is associated.

4. Food process line according to clause 1 or 2, wherein the first process line station of which the actuator is controlled is provided downstream of the second process line station with which the sensor is associated.

5. Food process line according to any of the preceding clauses, wherein a process line station further comprises a station controller communicatively connected to an actuator and a sensor of the same process line station, configured to control the actuator of the same process line station on the basis of data from the sensor of the same process line station; wherein preferably the interstation control system is also communicatively connected to at least two station controllers of distinct process line stations, thereby forming a main control system.

6. Food process line according to any of the preceding clause 5, wherein the interstation control system is communicatively connected to an actuator and/or sensor of a process line station via the controller of that same process line station.

7. Method for processing food in a food process line according to one or more of the preceding clauses, comprising the steps of:
  operating the sensor of the second process line station to obtain data;
  communicating the data from the sensor to the interstation control system;
  controlling the actuator of the first process line station on the basis of data from the sensor of the second process line station.

8. A food process line for in-line processing food, wherein the food process line comprises at least two of the following process line stations:
  A. food preparation station for preparing a pumpable food mass;
  B. cold store for cold storing a pumpable food mass;
  C. pump station for pumping a pumpable food mass;
  D. forming station for forming discrete food products from a pumpable food mass;
  E. dry coater for coating discrete food products with a dry coating, e.g. comprising an air knife for blowing off excess dry coating;
  F. wet coating device for coating discrete food products with a wet coating, optionally comprising a batter mixer;
  G. fryer for frying discrete food products;
  H. heater for subjecting discrete food products to a heat treatment;
  I. freezer for freezing discrete food products;
wherein the food process line comprises:
  a first process line station of said two process line stations, which is equipped with an actuator for carrying out an operation in relation to the food; and
  a second process line station of said two process line stations, which is equipped with a sensor acquiring data relating to the food and/or to the process line station;
  an interstation control system communicatively connected to the actuator of the first process line station and the sensor of the second process line station,
  wherein the interstation control system is configured to control the actuator of the first process line station on the basis of data from the sensor of the second process line station.

9. Food process line according to clause 8, wherein at least a third process line station of said list of process line stations is provided between the first process line station of which the actuator is controlled and the second process line station with which the sensor is associated.

10. Food process line according to clause 8 or 9, wherein the first process line station of which the actuator is controlled is provided upstream of the second process line station with which the sensor is associated.

11. Food process line according to clause 8 or 9, wherein the first process line station of which the actuator is controlled is provided downstream of the second process line station with which the sensor is associated.

12. Food process line according to any of the preceding clauses 8-11, wherein a process line station further comprises a station controller communicatively connected to an actuator and a sensor of the same process line station, configured to control the actuator of the same process line station of on the basis of data from the sensor of the same process line station; and wherein preferably the interstation control system is also communicatively connected to at least two station controllers of distinct process line stations, thereby forming a main control system.

13. Food process line according to any of the preceding clauses 8-12, wherein the interstation control system is communicatively connected to an actuator and/or sensor of a process line station via the controller of that same process line station.

14. Method for processing food in a food process line according to one or more of the preceding clauses 8-13, comprising the steps of:
  operating the sensor of the second process line station to obtain data;
  communicating the data from the sensor to the interstation control system;
  controlling the actuator of the first process line station on the basis of data from the sensor of the second process line station.

In embodiments a computing system is provided comprising one or more processors and a memory coupled to the one or more processors and storing program instructions, in particular a computer readable program code, that when executed by the one or more processors cause the one or more processors to at least determine data from the second process line station, and on the basis thereof instruct the actuators of the first process line station.

In embodiments a computing system is provided comprising one or more processors and a memory coupled to the one or more processors and storing program instructions, in particular a computer readable program code, that when executed by the one or more processors cause the one or more processors to at least operate the sensor of the second process line station to obtain data; communicate the data from the sensor to the interstation control system; and control the actuator of the first process line station on the basis of data from the sensor of the second process line station.

The present invention also relates to a method for processing food in a food process line, preferably a food process line as described above, comprising the steps of:
  operating the sensor of the second process line station to obtain data;
  communicating the data from the sensor to the interstation control system;
  controlling the actuator of the first process line station on the basis of data from the sensor of the second process line station.

The invention further relates to a computer-implemented method for processing food in a food process line as described above, further comprising a computing system comprising one or more processors, preferably microprocessors, wherein the method involves the processors executing computer readable program code for:
  operating the sensor of the second process line station to obtain data;
  communicating the data from the sensor to the interstation control system;
  controlling the actuator of the first process line station on the basis of data from the sensor of the second process line station.

The invention further relates to a computer-implemented method for processing food in a food process line as described above, further comprising a computing system comprising one or more processors, preferably microprocessors, wherein the method involves the processors executing computer readable program code for determining data from the second process line station, and on the basis thereof instruct the actuators of the first process line station.

The invention further relates to a computer program or suite of computer programs comprising at least one computer readable code portion or a computer program product storing at least one computer readable code portion, the computer readable code portion, when run on a computer system, being configured for executing the method as described above.

Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized.

A computer readable signal medium may include a propagated data signal with computer readable program code embodied therein, for example, in baseband or as (part of) a carrier wave. Such a propagated signal may take any of a variety of forms such as electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, such as wireless, wireline, optical fiber, cable, RF, etc., or any suitable combination of the foregoing. Computer program code for carrying out operations for aspects of the present invention can be written in one or more programming languages or combinations thereof, including object oriented programming language such as Java™, Smalltalk, C++ or the like and conventional procedural programming languages, such as the "C" programming language or similar programming languages. In embodiments, the program code executes on the user's computer, or alternatively partly on the user's computer, as a stand-alone software package, or alternatively partly on the user's computer and partly on a remote computer, or entirely on the remote computer or server. The remote computer may be connected to the user's computer through any type of network, including a local area network (LAN) or a wide area network (WAN), or the connection may be made to an external computer.

BRIEF DESCRIPTION OF THE DRAWINGS

Examples of embodiments of a food process line according to the present invention are elucidated in relation to the drawings, in which.

DETAILED DESCRIPTION OF VARIOUS EMBODIMENTS

Figure 1:
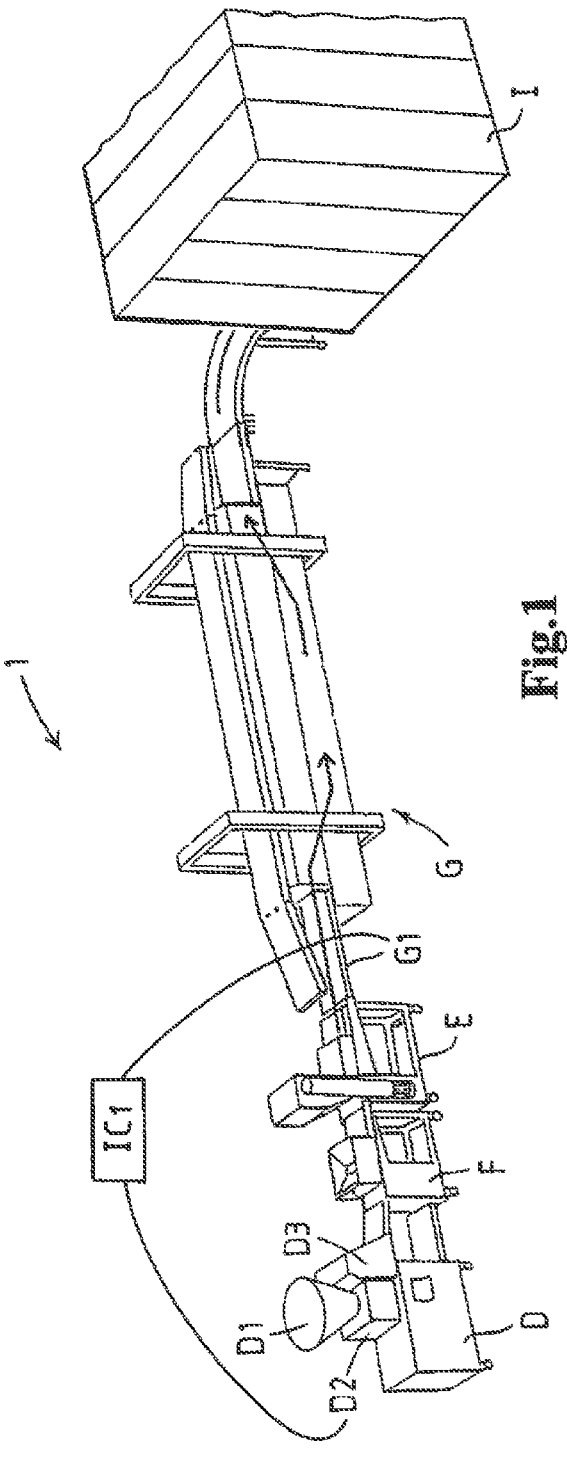
FIG. 1 is a perspective drawing of a first embodiment of an inventive food process line with five process line stations, FIG. 2 schematically represents a second embodiment of an inventive food process line, FIG. 3 schematically represents a third embodiment of an inventive food process line, FIG. 4 schematically represents a fourth embodiment of an inventive food process line FIG. 5 schematically represents a fifth embodiment of an inventive food process line, FIG. 6 schematically represents a sixth embodiment of an inventive food process line, FIG. 7 schematically represents a seventh embodiment of an inventive food process line, FIG. 8 schematically represents an eighth embodiment of an inventive food process line, FIG. 9 schematically represents a ninth embodiment of an inventive food process line, FIGS. 10*a* and 10*b* schematically represent alternatives for a tenth embodiment of an inventive food process line, FIG. 11 schematically represents an eleventh embodiment of an inventive food process line.

In FIG. 1 a first embodiment of an inventive food process line 1 is shown, for in-line processing food. The shown food process line 1 comprises five process line stations. In succession:

a forming station D, here a moulding device for moulding three-dimensional discrete food products from a mass. In particular, the moulding device D is designed to produce discrete food products from a mass of pounded meat, for example hamburgers or nuggets;

a wet coating device F, here a device designed to coat the outside of discrete food products with a layer of a liquid material, e.g. batter;

a dry coater E, here a crumbing device which can be used to apply a layer of coating material in crumb form to the outside of discrete food products;

a fryer G, here provided with a deep-frying bath;

and a freezer I for freezing discrete food products.

The forming station D comprises a hopper D1, a pump D2 and a mould drum D3. The pump D2 preferably comprises a sensor acquiring data relating to the food mass, such as temperature and viscosity. The shown fryer G comprises a conveyor G1, e.g. a belt conveyor, transporting the food products through the fryer. Advantageously, the velocity of the conveyor can be controlled, to adjust the dwell time of the food products in the fryer.

Hence, according to the invention, the pump D2 of the forming station D is provided with a sensor, and the fryer G is provided with an actuator, here conveyor G1. An interstation control system IC1 is provided, which is communicatively connected to the actuator of the conveyor G1 and the sensor of the pump D2. The interstation control system IC1 is configured to control the actuator of the conveyor G1, and hence the dwell time in the fryer G, on the basis of data such as temperature and viscosity from the sensor in the pump D2 of the forming station. Hence, here two processing stations, the wet coating device F and dry coater E, are provided between the station with the actuator and the station with the sensor. An advantage of this configuration is that the settings of the upstream device (fryer) are tuned in anticipation of the products, based on information from a downstream device—the pump.

Figure 2:
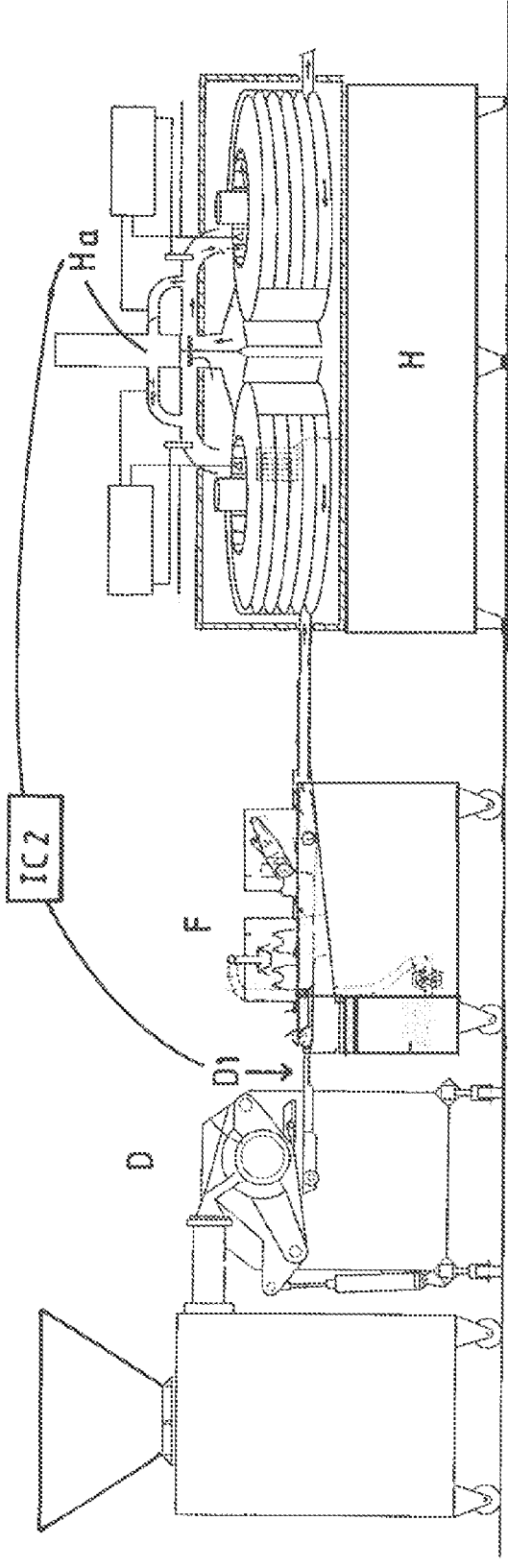

FIG. 2 schematically represents a second embodiment of an inventive food process line, wherein the process line comprises three process line stations. In succession:

a forming station D, here a moulding device for moulding three-dimensional discrete food products from a mass. In particular, the moulding device D is designed to produce discrete food products from a mass of pounded meat, for example hamburgers or nuggets. Preferably, a camera D1 is provided downstream of the moulding device, detecting the food product dimensions upon leaving the forming station D;

a wet coating device F, here a device designed to coat the outside of discrete food products with a layer of a liquid material, e.g. batter;

a heater H, here an oven for heating discrete food products. Preferably, the heater H comprises actuators Ha of such as the air temperature and/or air circulation speed and/or dwell time in the convection heater.

According to the invention, an interstation control system IC2 is provided, communicatively connected to the camera D1 of the forming station and the actuators Ha of the heater, which is configured to control the heater actuators Ha on the basis of the food product dimensions upon leaving the forming station D. Hence, here the wet coating device F is provided between the station D with the sensor D1 and the station H with the heater actuators Ha.

An advantage of this configuration is that the actuators of the heater can be set in anticipation of the products, based on data from the camera of the forming stations.

Actuator Upstream of Sensor

In FIGS. 3-7, embodiments of a food process line according to the invention are schematically indicated, wherein the first process line station equipped with an actuator is provided upstream of a second process line station equipped with a sensor.

Figure 3:
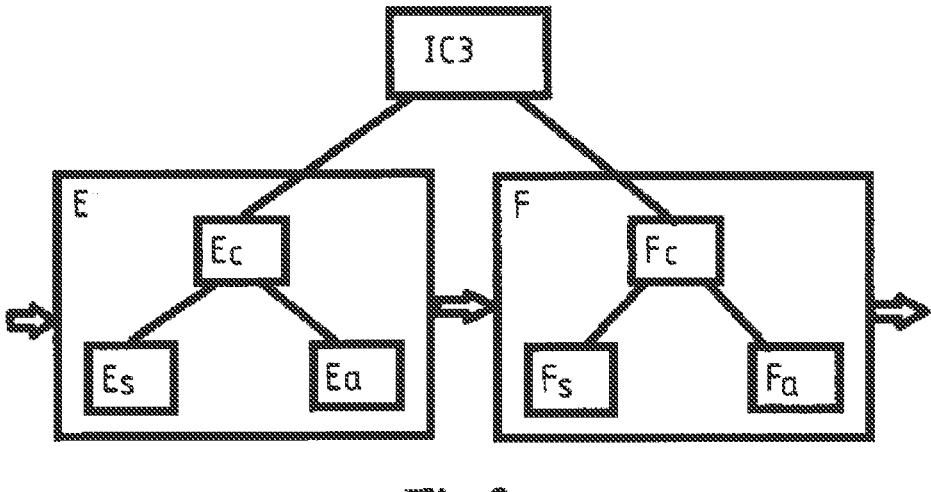

In FIG. 3, a dry coater process line station E is provided, in which discrete food products are coated with a dry coating. Such a station generally comprises a hopper for the dry coating, coating distribution means and possibly an air knife for blowing off excess dry coating. The dry coater E is provided with one or more actuators Ea, e.g. for setting the blow-off air temperature and/or the blow-off speed of the air knife. Possibly, the dry coater is also provided with sensors Es, e.g. for monitoring the dry coating consumption, and/or the stickiness of the food product prior to coating, and/or the food product weight after coating.

In embodiments, a dry coater controller Ec is provided, which is communicatively connected to an actuator Ea and a sensor Es of the dry coater station, for controlling the actuator Ea on the basis of data from the sensor Es. For example:

the blow-off air temperature and/or blow-off speed of the dry coater is/are controlled on the basis of food product weight after coating;

the blow-off air temperature and/or blow-off speed of the dry coater is/are controlled on the basis of coating coverage after coating;

the coating rate is controlled on the basis of the stickiness of the food product prior to coating.

Downstream of the dry coater E, a wet coating device F is provided. Here, the wet coating device F is provided with a sensor Fs for measuring the batter temperature. Optionally, the wet coating device F is also provided with an actuator Fa, e.g. for setting the batter temperature. Advantageously, a wet coating device controller Fc is communicatively connected to the actuator Fa setting the batter temperature and the sensor Fs measuring the batter temperature, wherein the wet coating station controller Fc is configured to control the actuator Fa setting the batter temperature on the basis of data from the sensor Fs measuring the batter temperature.

According to the present invention, an interstation control system IC3 is communicatively connected to an actuator Ea of the first dry coater process line station E, e.g. actuator Ea for setting the blow-off air temperature and/or the blow-off speed of the air knife, and a sensor Fs of the second wet coating device process line station F, e.g. a sensor Fs measuring the batter temperature of the wet coating device. The inventive interstation control system IC3 is configured to control the actuator Ea of the first process line station E on the basis of data from the sensor Fs of the second process line station F, thus in particular to control the blow-off air temperature and/or blow-off speed of the air knife of the dry coater E on the basis of batter temperature of the wet coating device F.

It is for example advantageous with a higher batter temperature, to set a higher blow-off air temperature. Or, the lower the batter temperature of the wet coating device F, the slower the blow-off speed of the air knife of the dry coater E.

In the shown embodiment, the interstation control system IC3 is directly connected to the actuator Ea and the sensor Fs. It is also conceivable that the interstation control system IC3 is connected to the actuator Ea via the dry coater controller Ec. In analogy, it is conceivable that the interstation control system IC3 is connected to the sensor Fs of the wet coater F via the wet coating device controller Fc. Hence, alternative to the embodiment shown in FIG. 1, the interstation control system IC3 is connected to the dry coater controller Ec and the wet coating device controller Fc.

Figure 4:
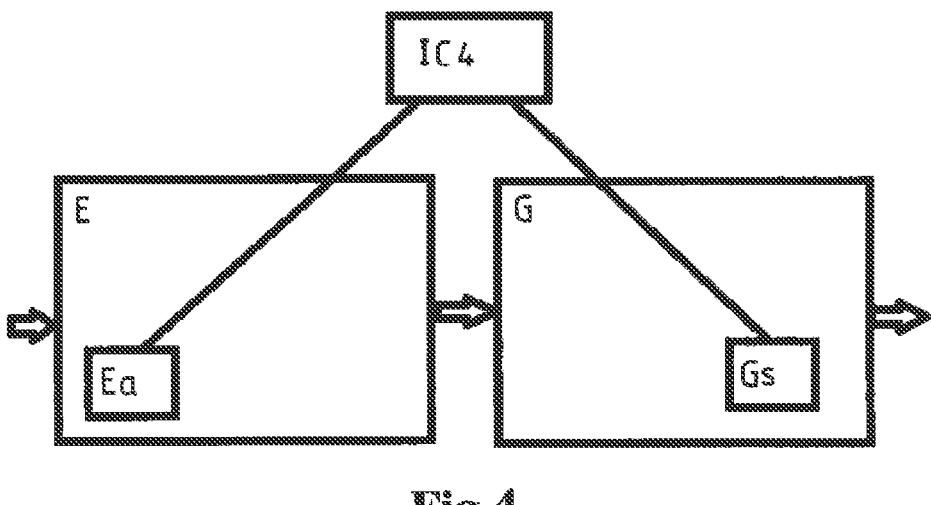

In FIG. 4, a dry coater process line station E is provided, in which discrete food products are coated with a dry coating. The dry coater E is provided with one or more actuators Ea, here for setting the blow-off speed of the air knife.

Downstream of the dry coater process line station E, a fryer G is provided. Possibly, but not necessarily, a third process line station such as a wet coating device is provided between the process line station E and the fryer G. The fryer G is provided with one or more sensors Gs, here for measuring the weight and/or volume of the discrete food products leaving the fryer.

According to the present invention, an interstation control system IC4 is communicatively connected to the actuator Ea of the dry coater E for setting the blow-off speed of the air knife, and a sensor Gs of the fryer G, for measuring the weight and/or volume of the discrete food products leaving the fryer G. The inventive interstation control system IC4 is configured to control the actuator Ea of the first process line station E on the basis of data from the sensor Gs of the second process line station G, thus in particular to control the blow-off speed of the air knife of the dry coater E on the basis of weight and/or volume of the discrete food products leaving the fryer G. Advantageously, the lower the weight of the discrete food products leaving the fryer G, the lower the blow-off speed of the air knife of the dry coater E to prevent products being blown off the conveyor. Or, the larger the volume of the discrete food products leaving the fryer G, the higher the blow speed of the air knife of the dry coater E.

Figure 5:
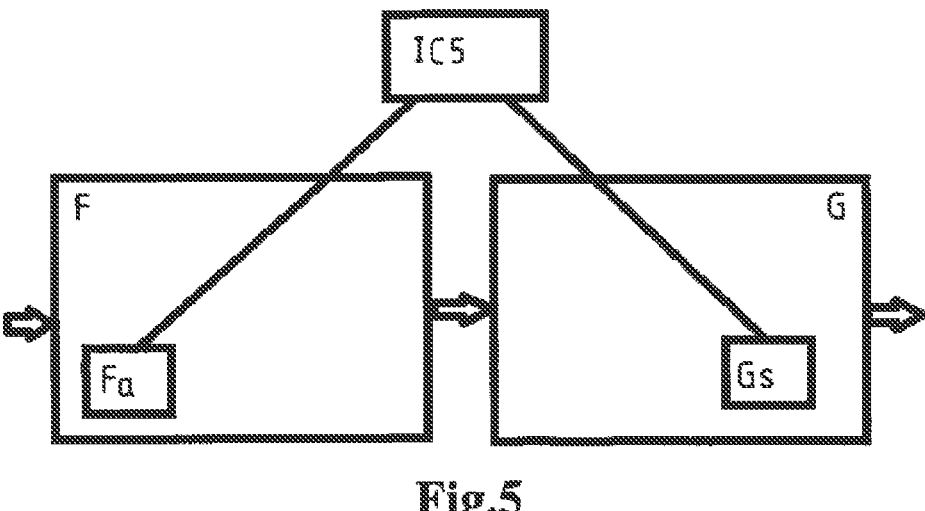

In FIG. 5, a food process line according to the invention is schematically indicated, wherein the first process line station is a wet coating device F, equipped with an actuator Fa, which is provided upstream of a second process line station fryer G, equipped with a sensor Gs. The wet coating device F comprises an actuator Fa for setting the blow-off speed of the air knife of the wet coating apparatus. The fryer G comprises a sensor Gs for measuring the weight and/or volume of the discrete food products leaving the fryer G.

An interstation control system IC5 is communicatively connected to the actuator Fa of the first wet coating device station F, and a sensor Gs of the fryer G, for measuring the weight and/or volume of the discrete food products leaving the fryer G. The inventive interstation control system IC5 is configured to control the actuator Fa of the first process line station F on the basis of data from the sensor Gs of the second process line station G, thus in particular to control the blow-off speed of the air knife of the wet coating device F on the basis of weight and/or volume of the discrete food products leaving the fryer G. For example, the lower the weight of the discrete food products leaving the fryer G, the lower the blow-off speed of the air knife of the wet coating device F. Or, the larger the volume of the discrete food products leaving the fryer G, the higher the blow speed of the air knife of the wet coating device F.

Figures 6, 7:
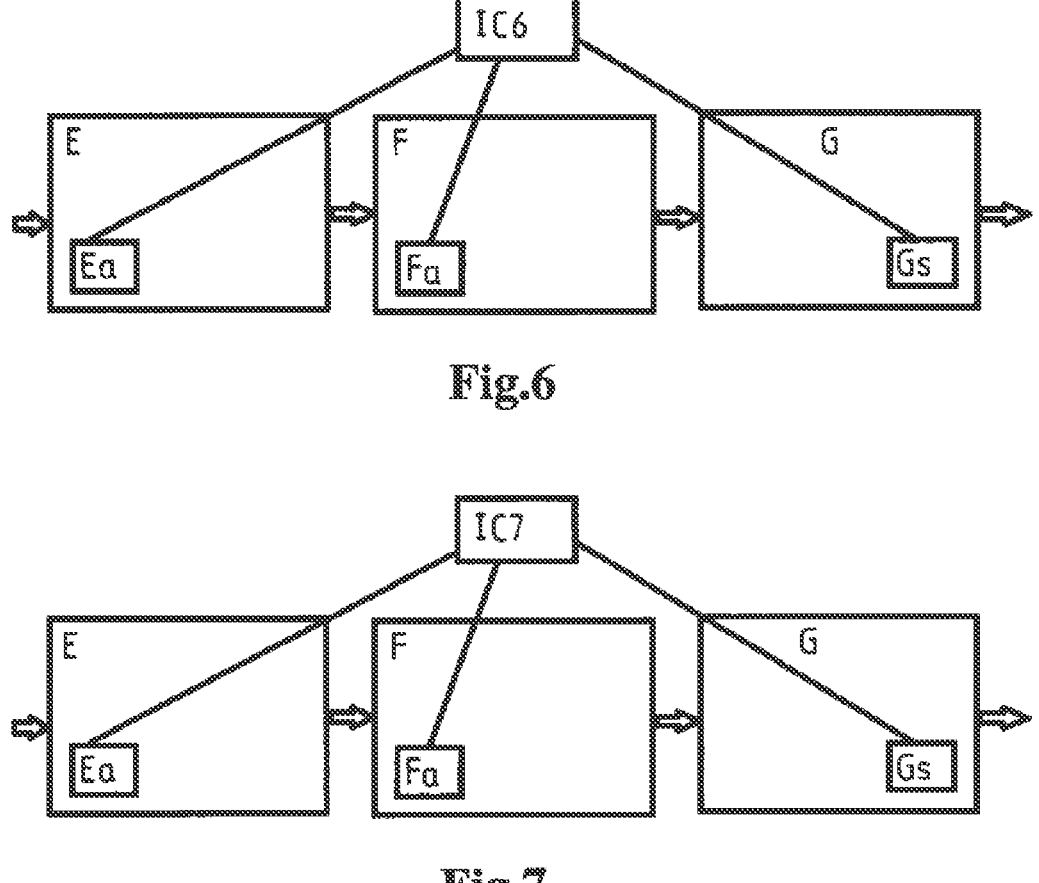

In FIG. 6, a food process line according to the invention is schematically indicated, wherein a dry coater E, equipped with an actuator Ea, is provided upstream of a wet coating device F, equipped with an actuator Fa, which in turn is provided upstream of a fryer G, equipped with a sensor Gs. The actuators Ea and Fa are provided for setting the blow-off speed of the air knife of the dry coater E and the wet coating device F respectively. The sensor Gs of the fryer G determines the oil quality and/or oil filter information of the fryer.

An interstation control system IC6 is communicatively connected to the actuators Ea and Fa and sensor Gs. The inventive interstation control system IC6 is configured to control the actuators Ea and/or Fa on the basis of data from the sensor Gs, thus in particular to control the blow-off speed of the air knife of the dry coater E and/or wet coating device F on the basis of the oil quality and/or oil filter information of the fryer G. Interstation control system IC6 has the advantage that upon detection of decreased oil quality and/or clogging of the oil filter of the fryer G, this information can be used as feedback to increase the blow-off speed of the air knife of the dry coater E and/or the wet coating device F.

In FIG. 7, a food process line according to the invention is schematically indicated, wherein a dry coater E, equipped with an actuator Ea, is provided upstream of a wet coating device F, equipped with an actuator Fa, which in turn is provided upstream of a fryer G, equipped with a sensor Gs. The actuators Ea and Fa are provided for setting the food product transport rate in the dry coater E and the wet coating device F respectively. The sensor Gs of the fryer G determines the rate of agglomerated products upon leaving the fryer G.

An interstation control system IC7 is communicatively connected to the actuators Ea and Fa and sensor Gs. The inventive interstation control system IC7 is configured to control the actuators Ea and/or Fa on the basis of data from the sensor Gs, thus in particular to control the food product transport rate in the dry coater E and/or wet coating device F on the basis of the rate of agglomerated products upon leaving the fryer G. This has the advantage that when more agglomerated products leaving the fryer G are detected, the food product transport rate in the dry coater E and/or in the wet coating device F can be adjusted. Such 'intelligent feedback' may prevent unnecessary rejection of products.

Figures 8, 9:
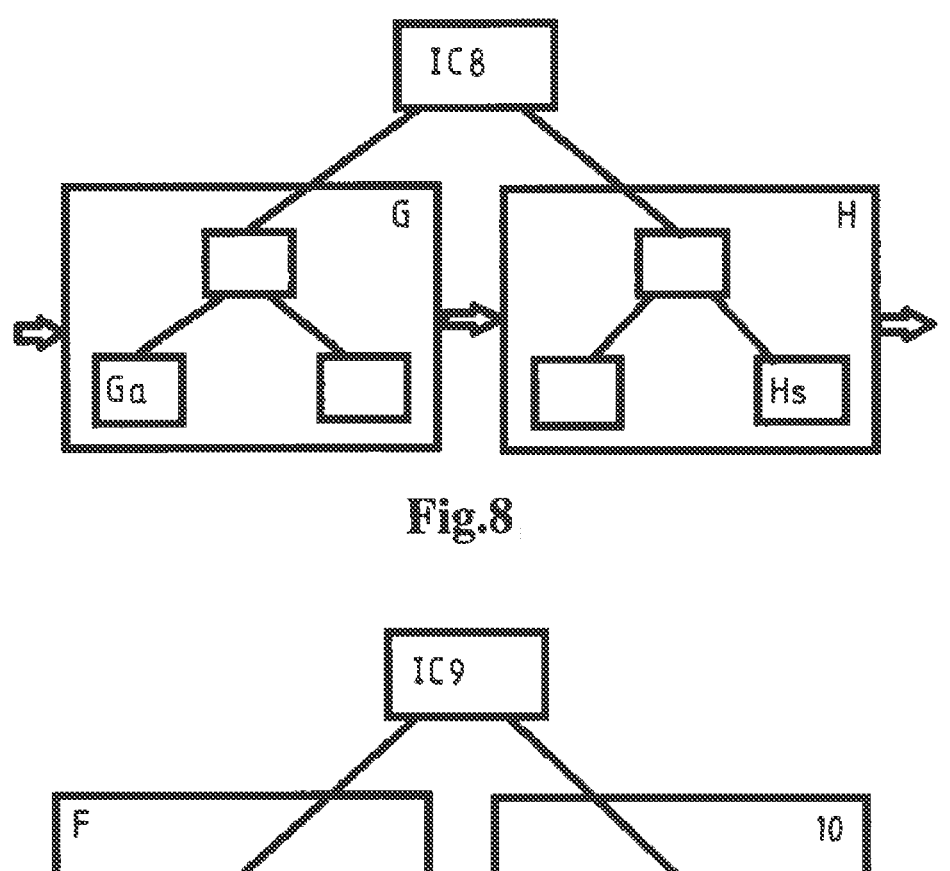

In FIG. 8, the food process line comprises a fryer G with an actuator Ga for setting the dwell time in the fryer G. Downstream of the fryer a heater H is provided, provided with a sensor Hs for determining the food product colour upon leaving the heater H. An interstation control system IC8 according to the invention is connected to the actuator Ga and the sensor Hs, and is configured to control the dwell time in the fryer G on the basis of the food product colour upon leaving the heater H.

In FIG. 9, part of a food process line is shown, comprising a wet coating device F with an actuator Fa for setting the food product transport rate in the wet coating device F. Downstream of the wet coating device F, a conveyor 10 is provided, which conveyor is equipped with a scale 10*s*, measuring the weight of the discrete food product. Optionally, a wet coating device and/or a fryer and/or a heater and/or a freezer for the discrete food products is/are provided between the wet coating device F and the conveyor 10.

An interstation control system IC9 according to the invention is connected to the actuator Fa and the sensor 10*s* and is configured to control the food product transport rate in the wet coating device F on the basis of the weight of the discrete food product on the conveyor 10. Advantageously, the transport rate is adapted on beforehand, prior to the arrival of the first food products.

Actuator Downstream of Sensor

In the drawings hereafter, embodiments of a food process line according to the invention are schematically indicated, wherein the first process line station equipped with an actuator is provided upstream of a second process line station equipped with a sensor.

Figures 10A, 10B, 11:
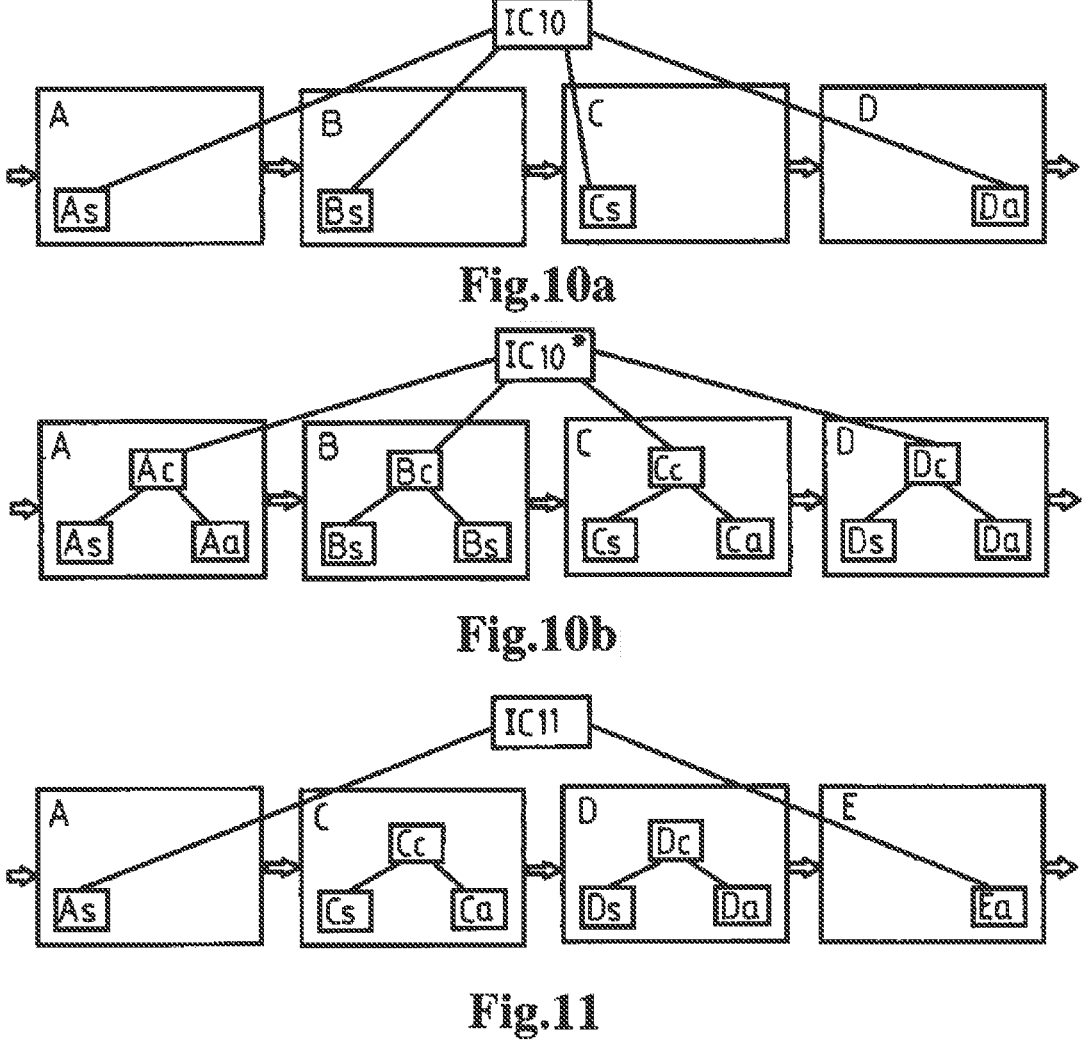

In FIGS. 10*a* and 10*b*, a part of a food process line is shown, comprising in succession a food preparation station A for preparing a pumpable food mass, a cold store B for cold storing a pumpable food mass, a pump station C for pumping a pumpable food mass and a forming station D for forming discrete food products from a pumpable food mass.

In FIGS. 10*a* and 10*b*, food preparation station A comprises a sensor As measuring the temperature of the pumpable food mass. In the embodiment to of FIG. 10*b*, the food preparation station A further comprises an actuator Aa for setting the temperature in the food preparation station A. A food preparation station controller Ac is also provided, configured to control the temperature actuator Aa of the food preparation station A on the basis of data from the temperature sensor As of the same process line station A.

Cold store B comprises a sensor Bs measuring the temperature of the pumpable food mass. In the embodiment of FIG. 10*b*, the cold store B further comprises an actuator Ba for setting the temperature in the cold store B. A cold store controller Bc is further provided, configured to control the temperature actuator Ba of the cold store B on the basis of data from the temperature sensor Bs of the same cold store B.

Pump station C comprises a sensor Cs measuring the temperature of the pumpable food mass. In the embodiment of FIG. 10*b*, the pump station C further comprises an actuator Ca for setting the temperature in the pump station C. A pump station controller Cc is provided, configured to control the temperature actuator Ca of the pump station C on the basis of data from the temperature sensor Cs of the same pump station C.

Forming station D comprises an actuator Da, e.g. an actuator setting the fill pressure, fill plate pressure settings, thermal actuators for heating of the hopper and/or the piping between hopper and moulding device, pump speed, etc. In the embodiment of FIG. 10*b*, the forming station D further comprises a sensor Ds, e.g. for measuring the temperature of the formed discrete food products. The forming station D further comprises a forming station controller Dc, configured to control e.g. the fill pressure of the forming station D on the basis of data regarding the temperature of the formed discrete food products from the temperature sensor Ds of the same forming station D.

According to the invention, an interstation control system IC10 is communicatively connected to an actuator Da of the forming station D, and a sensor As of the food preparation station, and/or a sensor Bs of the cold store, and/or a sensor Cs of the pump station, measuring the temperature of the pumpable food mass. The inventive interstation control system IC10 is configured to control the actuator Da of the forming station D on the basis of data from the one or more of the sensors As, Bs, Cs of the second process line station A, B and/or C. Advantageously, the interstation control system IC10 is configured to control the fill pressure on the basis of temperature of the food mass in the food preparation station and/or the cold store and/or the pump station. For example, the lower the temperature of the pumpable food mass, the higher the fill pressure is set.

In the configuration shown in FIG. 10a, the interstation control system IC10 is directly connected to the actuator Da and one or more of the sensors As, Bs and/or Cs. It is also conceivable, as shown in FIG. 10b, that the interstation control system IC10* is connected to the actuator Da via the forming station controller Dc. In analogy, it is conceivable that the interstation control system I10 is connected to the sensor As of the food preparation station A via the food preparation station controller Ac, the cold store controller Bc and/or the pump station controller Cc.

In a not shown embodiment, actuators of the dry coater such as blow-off air temperature and/or blow-off speed of the dry coater is/are controlled on the basis of the food temperature in/upon leaving the food preparation station and/or the food temperature in/upon leaving the cold store and/or the food temperature in/upon leaving the pump and/or the food temperature in/upon leaving the forming station.

In alternative not-shown embodiments, actuators of the wet coating device such as blow-off air temperature and/or blow-off speed of the wet coating apparatus is/are controlled on the basis of the food temperature in/upon leaving the food preparation station and/or the food temperature in/upon leaving the cold store and/or the food temperature in/upon leaving the pump and/or the food temperature in/upon leaving the forming station and/or the food product temperature in/upon leaving the dry coater.

In alternative not-shown embodiments, actuators of the fryer such as the oil temperature and/or oil circulation is/are controlled on the basis of the food temperature in/upon leaving the food preparation station and/or the food temperature in/upon leaving the cold store and/or the food temperature in/upon leaving the pump and/or the food temperature in/upon leaving the forming station and/or the food product temperature in/upon leaving the dry coater and/or the food product temperature in/upon leaving the wet coating device.

In the embodiment shown in FIG. 11, part of a food process line is shown, comprising a food preparation station A, and downstream thereof subsequently a pump station C, a forming station D and a dry coater E. Dry coater E is provided with an actuator Ea for setting the food product transport rate in the dry coater E. Upstream of the dry coater E, the food preparation station A is provided, which is equipped with sensor As, measuring the glucose content of the food mass.

An interstation control system IC11 according to the invention is connected to the actuator Ea and the sensor As, and is configured to control the food product transport rate in the dry coater E on the basis of the glucose content of the food mass in the food preparation station A. Possibly, the pump station C and forming station D are provided with associated actuators Ca, Da, sensors Cs and Ds and an associated pump station controller Cc and forming station controller Dc.

Figure 12:
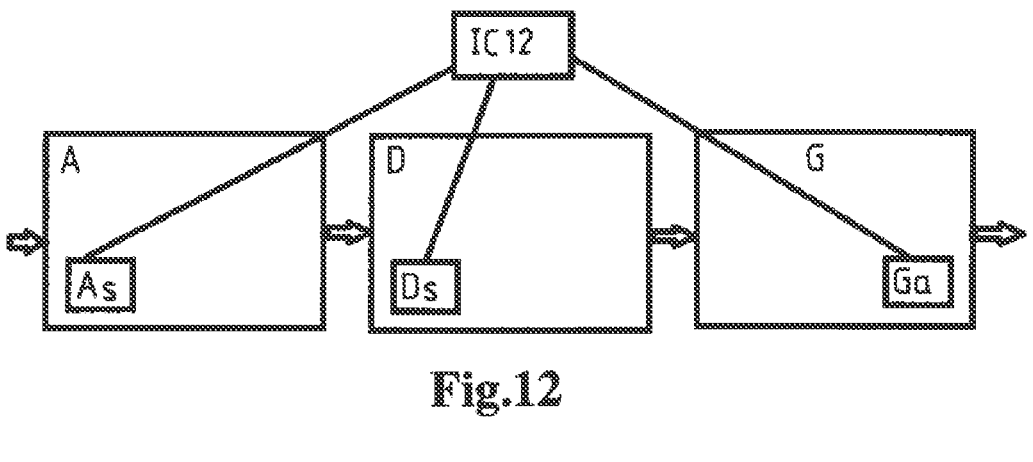
FIG. 12 schematically represents a twelfth embodiment of an inventive food process line, FIG. 13 schematically represents a thirteenth embodiment of a food process line according to the invention.

In the embodiment shown in FIG. 12, a food process line is shown, comprising a food preparation station A, and downstream thereof a forming station D for forming discrete food products and a fryer G. Possibly, but not necessarily, other process line stations are provided between the stations A, D and G.

The fryer G is provided with an actuator Ga for setting the dwell time of the discrete food product in the fryer G. Upstream of the fryer G, the food preparation station A and the forming station D are provided, which are equipped with sensors As, Ds, determining the colour of the food mass in the food preparation station and the colour of the discrete food products leaving the forming station D, respectively.

An interstation control system IC12 according to the invention is connected to the actuator Ga and the sensors As and/or Ds, and is configured to set the dwell time in the fryer G on the basis of the colour of the food mass in the food preparation station A, and/or the colour of the discrete food products leaving the forming station D.

Alternatively, the sensor As of the food preparation station determines the glucose content of the food upon leaving the preparation station. An interstation control system connected to the sensor As and the actuator Ga is advantageously configured to control the dwell time in the fryer G on the basis of the glucose content of food upon leaving the preparation station A.

Figure 13:
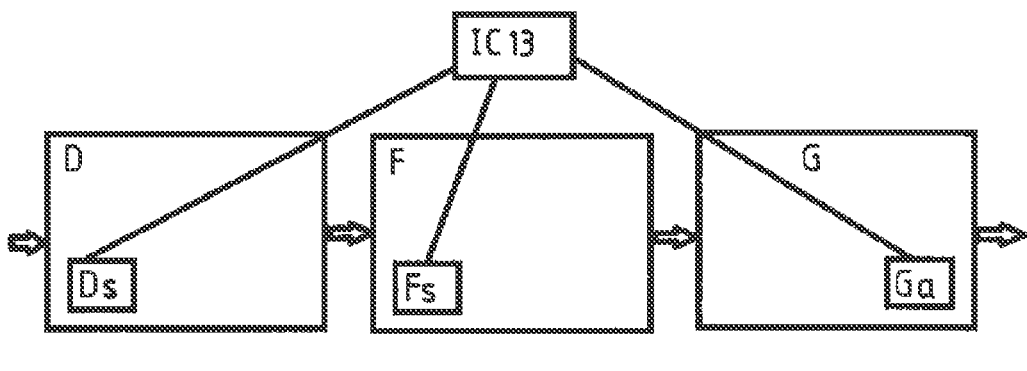

In the embodiment shown in FIG. 13, a food process line is shown, comprising a forming station D for forming discrete food products, a wet coating device F and a fryer G. Possibly, but not necessarily, other process line stations are provided prior to and/or between the stations D, F and G.

The fryer G is provided with an actuator Ga for setting the dwell time of the discrete food product in the fryer G, and/or the fryer oil temperature and/or oil circulation speed in the fryer. Upstream of the fryer G, the food forming station D and the wet coating device F are provided. The food forming station D and/or the wet coating device F are equipped with sensors Ds, Fs, determining the food product dimensions upon leaving the forming station D, and determining the wet coating coverage of the discrete food products upon leaving the wet coating device as determined by a camera, respectively.

An interstation control system IC13 according to the invention is connected to the actuator Ga and the sensors Ds and/or Fs, and is configured to set an actuator Ga of the fryer G, such as the fryer oil temperature and/or dwell time and/or oil circulation speed in the fryer, on the basis of the food product dimensions upon leaving the forming station D, and/or on the basis of wet coating coverage of the discrete food products upon leaving the wet coating device as determined by a camera.

In a not shown embodiment, an interstation control system IC is provided which is configured to control actuators of the fryer G such as the fryer oil temperature and/or dwell time and/or oil circulation speed in the fryer on the basis of food product weight and/or volume upon leaving the wet coating apparatus F.

In a not shown embodiment, an interstation control system IC is provided which is configured to control actuators of the fryer G such as the fryer oil temperature and/or dwell time and/or oil circulation speed in the fryer on the basis of colour scan of food upon leaving the preparation station A or the cold store B.

In a not shown embodiment, an interstation control system IC is provided which is configured to control actuators of the fryer G such as the fryer oil temperature and/or dwell time and/or oil circulation speed in the fryer on the basis of the glucose content of food upon leaving the preparation station A.

In a not shown embodiment, an interstation control system IC is provided which is configured to control actuators of the convection heater A such as the air temperature and/or air circulation speed and/or dwell time and/or dew point in the convection on the basis of food temperature in and/or upon leaving the food preparation station A, and/or on the basis of a colour scan of food upon leaving the preparation station, and/or on the basis of the glucose content of food leaving the preparation station.

In a not shown embodiment, an interstation control system IC is provided which is configured to control actuators of the convection heater H such as the air temperature and/or air circulation speed and/or dwell time in the convection heater on the basis of the food temperature in/upon leaving the food preparation station A and/or the food temperature in/upon leaving the cold store B and/or the food temperature in/upon leaving the pump C and/or the food temperature in/upon leaving the forming station D and/or the food product temperature in/upon leaving the dry coater E and/or the food product temperature in/upon leaving the wet coating device F and/or the food product temperature in/upon leaving the fryer G.

In a not shown embodiment, an interstation control system IC is provided which is configured to control actuators of the freezer I such as the dwell time and/or temperature in the freezer on the basis of the food temperature in/upon leaving the food preparation station A and/or the food temperature in/upon leaving the cold store B and/or the food temperature in/upon leaving the pump C and/or the food temperature in/upon leaving the forming station D and/or the food product temperature in/upon leaving the dry coater E and/or the food product temperature in/upon leaving the wet coating device F and/or the food product temperature in/upon leaving the fryer G, and/or the food product temperature in/upon leaving the convection heater H.

The invention claimed is:

1. A method for processing food in a food process line including a plurality of process line stations, a first process line station of said plurality of process line stations equipped with an actuator for carrying out an operation in relation to the food, a second process line station of said plurality of process line stations equipped with at least one sensor acquiring data relating to the food and/or to the food process line, a third process line station of said plurality of process line stations provided in the food process line between the first process line station and the second process line station, and an interstation control system communicatively connected to the actuator of the first process line station and the at least one sensor of the second process line station, which interstation control system is configured to control the actuator of the first process line station based on data from the at least one sensor of the second process line station, the method comprising the steps of:

operating the at least one sensor of the second process line station to obtain data;

communicating the data from the at least one sensor to the interstation control system;

controlling the actuator of the first process line station on the basis of based on data from the at least one sensor of the second process line station;

wherein the step of controlling the actuator of the first process line station is dependent on both an actual process variable as acquired from the at least one sensor and a desired process variable to provide a feedback loop ensuring the interstation control system exerts a control action in the first process line station at a same value as to adjust the actual process variable to obtain the desired process variable; and wherein the plurality of process line stations are selected from the following:

forming station for forming discrete food products from a pumpable food mass, the forming station including a temperature sensor configured to acquire temperature data relating to the food;

dry coater for coating discrete food products with a dry coating, the dry coater provided in the food process line between a wet coating device and a fryer, the dry coater including an air knife for blowing off excess dry coating;

wet coating device for coating discrete food products with a wet coating, the wet coating device provided in the food process line between the fryer and the forming station, the wet coating device including a temperature sensor configured to acquire temperature data relating to batter temperature;

fryer for frying discrete food products, the fryer including the actuator for carrying out the operation in relation to the food, the fryer further including a conveyor configured to transport the food products through the fryer, wherein the actuator is configured to control velocity of the conveyor for adjusting dwell time of the food products in the fryer; and freezer for freezing discrete food products;

wherein the food process line comprises, in succession, the forming station, the wet coating device, the dry coater, the fryer, and the freezer;

wherein the interstation control system is communicatively connected to the fryer and the at least one sensor of the second process line station, and is further configured to control the velocity of the conveyor of the fryer based on the temperature data from the forming station.

2. The method according to claim 1, wherein the interstation control system is configured to acquire and store a collection of data from the at least one sensor in a memory, and wherein the actuator of the first process line station is controlled on the basis of an analysis of this collection of data, the actuator being controlled only when the analysis of the collection of data reveals a trend.

3. The method according to claim 1, wherein the plurality of process line stations further includes at least one of the following:

food preparation station for preparing a pumpable food mass;

cold store for cold storing a pumpable food mass;

pump station for pumping a pumpable food mass; and heater for subjecting discrete food products to a heat treatment.

4. The method according to claim 3, wherein the plurality of process line stations includes the heater for subjecting the discrete food products to the heat treatment, wherein the heater is a convection heater with two climate chambers configured to be controlled individually and the heat treatment includes cooking the discrete food products.

5. A computer-implemented method for processing food in a food process line including a plurality of process line stations, a first process line station of said plurality of process line stations equipped with an actuator for carrying out an operation in relation to the food, a second process line station of said plurality of process line stations equipped with at least one sensor acquiring data relating to the food and/or to the food process line, a third process line station of said plurality of process line stations provided in the food process line between the first process line station and the second process line station, and an interstation control system communicatively connected to the actuator of the first process line station and the at least one sensor of the second process line station, which interstation control system is configured to control the actuator of the first process line station based on data from the at least one sensor of the second process line station, further including one or more processors with the interstation control system, wherein the method comprising the following steps of executing computer readable program code by the one or more processors:

operating the at least one sensor of the second process line station to obtain data;

communicating the data from the at least one sensor of the second process line station to the interstation control system;

controlling the actuator of the first process line station based on data from the at least one sensor of the second process line station;

wherein the step of controlling the actuator of the first process line station is dependent on both an actual process variable as acquired from the at least one sensor and a desired process variable to provide a feedback loop ensuring the interstation control system exerts a control action in the first process line station at a same value as to adjust the actual process variable to obtain the desired process variable;

wherein the plurality of process line stations are selected from the following:

forming station for forming discrete food products from a pumpable food mass, the forming station including a temperature sensor configured to acquire temperature data relating to the food;

dry coater for coating discrete food products with a dry coating, the dry coater provided in the food process line between a wet coating device and a fryer, the dry coater including an air knife for blowing off excess dry coating;

wet coating device for coating discrete food products with a wet coating, the wet coating device provided in the food process line between the fryer and the forming station, the wet coating device including a temperature sensor configured to acquire temperature data relating to batter temperature;

fryer for frying discrete food products, the fryer including the actuator for carrying out the operation in relation to the food, the fryer further including a conveyor configured to transport the food products through the fryer, wherein the actuator is configured to control velocity of the conveyor for adjusting dwell time of the food products in the fryer; and freezer for freezing discrete food products;

wherein the food process line comprises, in succession, the forming station, the wet coating device, the dry coater, the fryer, and the freezer;

wherein the interstation control system is communicatively connected to the fryer and the at least one sensor of the second process line station, and is further configured to control the velocity of the conveyor of the fryer based on the temperature data from the forming station.

\* \* \* \* \*